United States Patent [19]

Mahn, Sr.

[11] Patent Number: 4,786,349

[45] Date of Patent: Nov. 22, 1988

[54] METHOD OF APPLYING HEAT ACTIVATED TRANSFER

[76] Inventor: John E. Mahn, Sr., 6154 Oakhaven Dr., Cincinnati, Ohio 45238

[21] Appl. No.: 41,866

[22] Filed: Apr. 23, 1987

[51] Int. Cl.[4] ........................ B32B 31/00; B44C 1/17; B65C 9/25

[52] U.S. Cl. .................................... 156/234; 156/155; 156/240; 156/309.6; 156/323

[58] Field of Search ............... 156/230, 238, 239, 240, 156/247, 249, 344, 155, 309.6, 234, 323; 101/211; 427/149, 259; 428/40, 41, 202, 200, 914

[56] References Cited

U.S. PATENT DOCUMENTS

| | | | |
|---|---|---|---|
| 3,255,695 | 6/1966 | Johnson et al. | 101/211 |
| 3,359,127 | 12/1967 | Meyer et al. | 428/914 |
| 3,379,592 | 4/1968 | Ostrowicz | 156/247 |
| 3,554,836 | 1/1971 | Steindorf | 156/247 |
| 3,595,739 | 7/1971 | Meyer | 40/2 R |
| 3,660,212 | 5/1972 | Liebe, Jr. | 428/41 |
| 3,920,499 | 11/1975 | Day et al. | 156/240 |
| 3,922,435 | 11/1975 | Asne | 156/240 |
| 3,959,555 | 5/1976 | Day et al. | 156/240 |
| 4,037,008 | 7/1977 | Tugwell | 156/249 |
| 4,107,365 | 8/1978 | Reed et al. | 156/240 |
| 4,246,315 | 1/1981 | Kopp et al. | 428/914 |
| 4,256,795 | 3/1981 | Day et al. | 428/202 |
| 4,269,885 | 5/1981 | Mahn | 428/200 |
| 4,390,387 | 6/1983 | Mahn | 428/200 |
| 4,401,494 | 8/1983 | Pernicano et al. | 156/239 |
| 4,466,994 | 8/1984 | Hubbard et al. | 427/148 |
| 4,610,904 | 9/1986 | Mahn, Sr. | 156/540 |

*Primary Examiner*—Michael W. Ball

*Assistant Examiner*—Louis Falasco

*Attorney, Agent, or Firm*—Wood, Herron & Evans

[57] ABSTRACT

The present invention is a method of applying a heat activated transfer to a cloth substrate. The transfer includes a thermoplastic adhesive layer and printed thereon a thermoset ink layer. The thermoset ink layer is discontinuous leaving exposed areas of thermoplastic material. The transfer is applied by setting the thermoplastic layer against a substrate, such as a cloth shirt, placing a piece of blotting paper or other absorbent material above the transfer in contact with the thermoset layer and applying heat and pressure forcing the thermoplastic material to melt. The thermoplastic material which contacts the blotting material is absorbed by the blotting paper whereas the thermoplastic material covered with the thermoset ink absorbs into the substrate bonding the thermoset ink to the substrate providing an emblem or the like. The invention also includes the article itself which is a heat activated transfer including a continuous thermoplastic layer and a discontinuous thermoset layer leaving voids in between the portions of the thermoset material.

6 Claims, 1 Drawing Sheet

METHOD OF APPLYING HEAT ACTIVATED TRANSFER

BACKGROUND OF THE INVENTION

Ornamental transfers and indicia presenting heat activated decoratives which have various indicia are well known and are typically applied to cloth and other substrates, particularly clothing. These decoratives, particularly heat activated decoratives, are used to provide numbers on sports jerseys, names on shirts and company logos on uniforms.

There are several types of heat activated decoratives. These have a hot melt adhesive layer which bonds to a cloth substrate. A second, upper layer can be formed of a variety of different materials including thermoplastics, thermosets, flock, and plastisols. In other applications, thread in the form of an embroidered letter can be the upper layer with a thermoplastic adhesive layer on the bottom. These are all applied to a substrate by heat, pressure and time sufficient to melt the hot melt adhesive layer and permit penetration of the melted adhesive into the surface of a garment. Other decoratives ar formed from thermosetting resins which can be cured as they are applied to the substrate.

There are many different types of transfers disclosed in the literature. For example, Liebe U.S. Pat. No. 3,660,212, discloses a heat activated transfer formed of a polyvinyl chloride lower layer and a surface layer of a cross-linked polyvinyl chloride plastisol. The plastisol is highly pigmented and it acts as an ink.

Another decorative is disclosed in Mahn U.S. Pat. No. 4,390,387. This patent discloses a flocked decorative with a lower thermoplastic layer. Further, Mahn U.S. Pat. No. 4,610,904, discloses a heat activated removable ornamental transfer which includes a lower thermoplastic layer and an upper continuous layer of a thermoset material. The upper layer is preferably a thermoset ink. To apply such a transfer, a heat source is applied against the composite. This is pressed against a cloth substrate causing the softened thermoplastic to flow into the cloth and to adhere. The upper layer, as disclosed in this patent, is a continuous layer which stands between the heat source and the thermoplastic layer. A silicone coated sheet can be placed between the heat source and the thermoset layer.

Embroideries which have a thermoplastic layer are usually formed by stitching thread into a scrim fabric. A thermoplastic layer is then laminated thereto. This is then heated and excess thermoplastic material can be removed with an absorbent material such as blotting paper. However, this is applied to a garment by applying heat and pressure directly against the threading which in turn heats up the thermoplastic layer allowing it to be applied to a substrate. Blotting paper is not used in any way to apply the embroidery transfers to a cloth substrate.

The problem with the heat activated film transfers such as the ones disclosed in the Mahn reference is that there must be a continuous upper thermoset layer above the thermoplastic layer. If there is not such an upper, continuous thermoset layer, thermoplastic material will mar the substrate and the heating surface. This presents a problem if one wishes to have a transfer which has a plurality of discrete indicia separated by voids. An example of such a transfer is a person's name which is not resting on a solid background.

It is of course known that one can take a solid laminate that has a continuous thermoplastic layer on the bottom and a continuous thermoset layer on the top and cut these into letters. However, this is expensive, not always precise and impractical for small letters. It would be much more desirable to simply print the indicia bearing thermoset layer using a printing process and without cutting. However, according to present techniques, this would require precise alignment of a thermoplastic layer below a thermoset layer. Even with precise alignment, it is still likely that during application some of the thermoplastic layer will exude from under the thermoset layer marring the transfer.

SUMMARY OF THE INVENTION

Accordingly, it is an object of the present invention to provide a heat activated transfer which has an upper heat resistant layer applied to a lower thermoplastic layer wherein the upper layer is a discontinuous layer which does not completely cover the thermoplastic layer. Further, it is an object of the present invention to provide a heat activated transfer which has a continuous thermoplastic layer and printed thereon a discontinuous or irregular thermoset ink layer which provides the indicia of the transfer.

Further, it is an object of the present invention to provide a method of applying such a heat activated transfer to a cloth or other substrate. More particularly, it is an object of the present invention to provide such a method wherein the uncoated thermoplastic is removed from the substrate during application to avoid marring of the substrate and eliminating the necessity to cut the transfer.

These and other objects and advantages of the present invention are provided by a heat activated transfer that has a lower continuous thermoplastic layer and printed thereon a non-continuous heat resistant upper layer, i.e., one with a plurality of discrete indicia bearing symbols.

According to the method of the present invention, the heat activated transfer is applied to the cloth substrate by positioning the transfer on the substrate with a thermoplastic adhesive layer against the substrate. An absorbing sheet is then applied against the upper layer between the transfer and an upper heating element. Heat and pressure is then applied against the absorbing material or sheet towards the substrate heating the upper layer and melting the thermoplastic layer. The excess molten thermoplastic is absorbed by the absorbing sheet which is subsequently pulled away leaving behind the heat resistant material bonded to the substrate by the thermoplastic material.

Other objects and advantages of the present invention will be appreciated in light of the following details and descriptions in which:

DETAILED DESCRIPTION OF THE DRAWINGS

DETAILED DESCRIPTION

Figure 1:
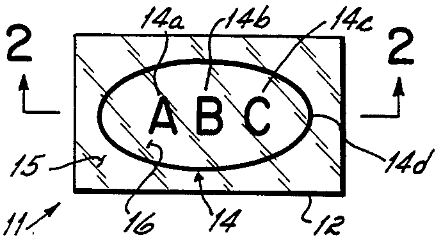
FIG. 1 is a plan view of a heat activated transfer made according to the present invention.
Figure 2:
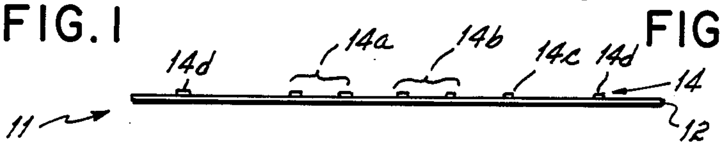
FIG. 2 is a cross sectional plan view taken at lines 2—2 of FIG. 1.

The present invention is a unique heat activated transfer and a unique method of applying this heat activated transfer to a substrate such as cloth or the like. As shown in FIGS. 1 and 2, the heat activated transfer 11 of the present invention includes at least two layers and preferably only two layers.

Lower layer 12 is a thermoplastic material which intended to be heat bonded to the cloth substrate such as a shirt. Preferably it is a thermoplastic polymer having a high melting point, preferably one which does not flow at less than 350° F. and preferably 400° F. For certain markets, adhesives with lower melting points such as 200° F. can be used. The thermoplastic layer should be one which can be easily removed from a garment either by heat or solvent. Suitable solvent removable thermoplastics include polyesters, polyamides, polyurethanes and polyethers. High melt polyurethanes are preferred and can be removed with dimethyl formaldehyde as well as cyclohexanol. Polymers such as polyvinyl chloride are not easily removed by solvents since they tend to totally dissolve in the solvents and sink into the garment permanently marring the garment.

The preferred adhesive of the present invention is a polyurethane thermoplastic made by the K. J. Quinn Company in Malden, Mass., PS-27. This product has a Shore A hardness of 85–90, a Shore D hardness of 35–40 and a melting temperature of 400°–420° F. Also suitable is Emhart Bostik brand polyester thermoplastic having a softening point of 225° F.

The thermoplastic layer must be compatible with the upper layer 14 so separating or delamination does not occur upon application. Therefore, it may be preferable to employ the same class of polymer for the thermoplastic layer 12 and upper layer 14.

The upper layer 14 is a heat resistant material which must not become distorted at application temperature. It must remain solid at the softening temperature of the thermoplastic layer 12. It can be a thermoplastic which has a softening point greater than the melting point of thermoplastic layer 12. If application temperature and pressure cause distortion of the upper layer 14, it is not sufficiently heat resistant for use in the present invention. The upper layer 14 should be a thermoset material, flock or thread etc.

The upper layer 14 is preferably a thermoset plastic. A thermoset plastic is a resin which in its final state is substantially infusable and insoluble. Thermosetting resins, often liquids at some state in their manufacture or process, are cured by heat, catalysis or other chemical means. After being fully cured, thermosets cannot be resoftened by heat.

Thermosets include those plastics which are normally thermoplastic but which are made thermosetting by means of cros linking with other materials such as cross linked polyolefins. Thermosets do not include plastisols which are a suspension of finely divided vinyl chloride polymer or copolymer in a liquid plasticizer which dissolves the resin when heated. Plastisols by some definitions are considered to be thermosetting in that they harden when heated. However, these compounds remain thermoplastics once solidified and accordingly are not included within the term thermoset.

This thermoset layer 14 preferably should be able to withstand a high temperature laundering. Specifically, it should not be hydrolyzed by aqueous alkaline solutions having a pH of 10 or more and preferably at 11 at temperatures ranging from 200° to 212° F. for thirty to forty-five minutes. Hydrolysis specifically refers to a chemical reaction in which water reacts with another substance to form one or more new substances. Generally polymers which are not hydrolyzable under alkaline conditions are thermoset polyamides, thermoset polyurethanes, thermoset polyolefins, thermoset polyepoxides and thermoset polyesters. Other polymers of course can be formulated so that they are not hydrolyzable at high pH's by controlling the cross linking.

The upper thermoset layer 14 is preferably a polymeric ink. In the present invention, ink refers to a resin including a sufficient concentration of pigment and carrier to provide a stable dispersion of pigment and in an amount effective to provide a desired color. Suitable pigments and carriers are well known to those of ordinary skill in the art. Typically, a carrier would be a clay or amorphous polymer.

Further, in the present invention, the thermoset nonhydrolyzable ink must not decompose at temperatures below 500° F. In high temperature industrial laundering facilities, the drying activities will frequently subject the upper surface momentarily to temperatures of about 500° F. Therefore, it is important that the polymer not to decompose at these temperatures.

As stated, there are many different types of polymers which would be suitable for use in the present invention. One particularly useful thermoset, non-hydrolyzable ink, is a moisture cured polyurethane ink. The moisture cured polyurethanes ar isocyanate terminated polymers. The curing takes place by the reaction of the isocyanate with atmospheric moisture. Specific moisture cured polyurethane inks useful in the present invention are presented in the following Examples.

EXAMPLE 1

White Ink

A white ink suitable for use in the present invention is prepared by simply mixing the following components:

- 26.5% Zephrylon 55515 clear polyurethane varnish
- 12.8% Zephrylon K-45500 moisture cure polyurethane catalyst
- 60 7% Zephrylon K-71026 white pigmented polyurethane All of these products are produced and sold by the Sinclair and Valentine Chemical Coatings Group of Wheelabrator-Frye Inc. of North Kansas City, Mo. In this example, polyurethane varnish is added to make the ink non-hydrolyzable at higher pHs, i.e., about 11. This is required because the white ink is so heavily loaded with pigment and carrier.

EXAMPLE 2

Red Ink

A red ink was formulated from the following components:

- 20% Zephyrlon K-45500 moisture cure polyurethane catalyst
- 80% Zephrylon K-57271 red pigmented polyurethane

EXAMPLE 3

Black Ink

A black ink was formulated from the following components:

20% Zephrylon K-45500 moisture cure polyurethane catalyst

80% Zephrylon K-55716 black pigmented polyurethane

EXAMPLE 4

Blue Ink

A blue ink was formulated from the following components:

20% Zephyrlon K-45500 moisture cure polyurethane catalyst

80% Zephyrlon K-57278 blue pigmented polyurethane

Figure 1A:
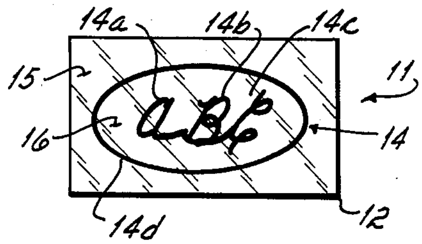
FIG. 1A is a plan view of an alternate embodiment of the invention.

As shown in FIGS. 1 and 2, the decorative transfer of the present invention has the continuous thermoplastic layer 12 and printed thereon the upper thermoset layer 14 which includes a plurality of discrete or discontinuous indicia bearing characters 14*a*, 14*b*, 14*c* and 14*d* in this embodiment. Layer 12 is shaded to indicate that it is not completely covered by layer 14 and various void portions such as 15 and 16 are an exposed or uncovered portions. FIG. 1A shows a different embodiment wherein the upper thermoset layer 14, although being one character is not a continuous layer, still leaving portions 15 and 16 exposed.

To manufacture this laminate, the thermoplastic layer 12 is extruded onto a release coated sheet not shown. The upper thermoset ink layer 14 is then roll coated onto the thermoplastic layer 12 and allowed to cure. Prior to application to a substrate, the lower release coated layer is simply pulled from a thermoplastic layer. Thus, according to the present invention the heat transfer 11 consists of a continuous thermoplastic layer with a discontinuous upper thermoset layer bonded thereto leaving exposed portions 16 and 15 on the side of the thermoset layer 14.

Figure 3:
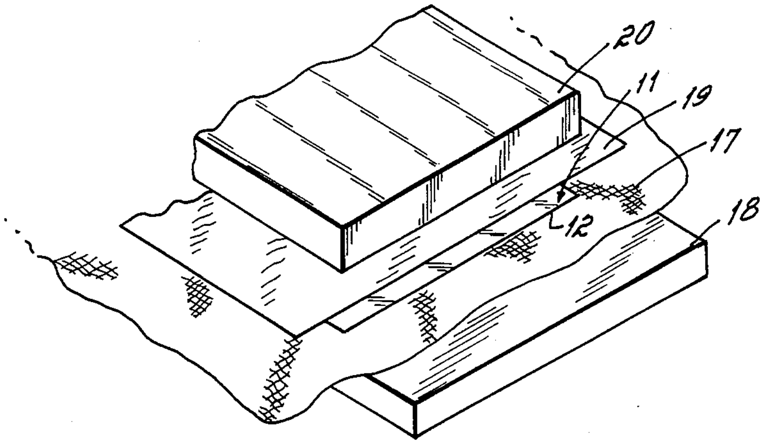
FIG. 3 is a diagrammatic depiction, in isometric, of the method of the present invention.

The decorative transfer of the present invention is applied to a substrate by melting the thermoplastic layer causing a portion of it to adhere to the substrate. More particularly, as shown in FIG. 3, the cloth substrate 17 rests on a support 18 which may also be a heated platen. The cloth substrate 17 can be either woven or nonwoven material. The transfer 11 is applied against the substrate with the thermoplastic layer 12 resting on the substrate and the thermoset layer 14 opposite the substrate.

A piece of absorbing material 19, large enough to completely cover the thermoplastic layer, is applied above the transfer 12 completely covering both the thermoset and the thermoplastic layers. Since the thermoset is discontinuous, the absorbing material 19 will contact both the thermoset layer and the exposed portions of the thermoplastic layer. The characteristics of the absorbing layer are discussed below.

Figure 4:
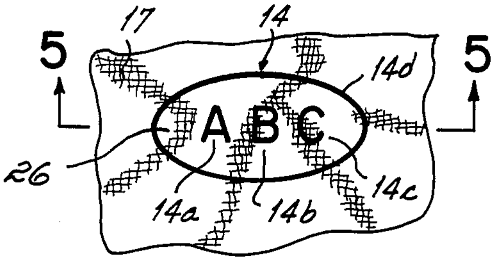
FIG. 4 is a plan view of a heat transfer of the present invention applied to a substrate.
Figure 5:
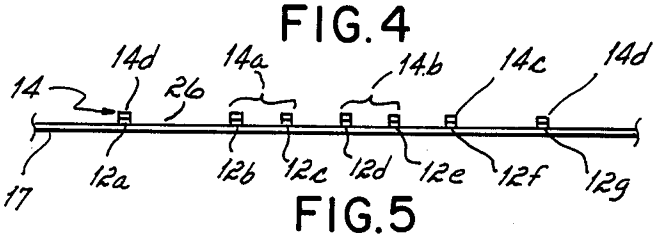
FIG. 5 is a cross section taken at line 5—5 of FIG. 4.

Heat and pressure is then applied, such as by heated platen 20, directly against the absorbing material 19 for sufficient time, temperature and pressure to cause the thermoplastic layer 12 to soften or melt. The portions beneath the thermoset layer 14 will sink into the cloth substrate 17 while the portions of the thermoplastic layer not covered by the thermoset layer will become molten and absorb onto the absorbent material 19. The platen 20 is then removed. The absorbing material 19 is then pulled from the decorative 11 pulling with it any thermoplastic material that it contacted, i.e., those portions in areas 16 and 15 as shown in FIG. 1. This leaves behind a transfer on the cloth substrate as shown in FIG. 4 and 5, respectively. It should be noted that the thermoset layer 14, including the discrete indicia 14*a*, 14*b*, 14*c* and 14*d* are bonded by thermoplastic portions 12*a*, 12*b*, 12*c*, 12*d*, 12*e*, 12*f* and 12*g* which bond to the cloth substrate 17. There is no readily observable thermoplastic material on the cloth substrate in areas such as 26 where there is no thermoset layer, even though these areas may be bounded on all sides by thermoset layers as in FIGS. 3 and 5.

The absorbing sheet 19 is one which has a greater affinity for the softened or molten thermoplastic adhesive material 12 than does the substrate 17. Accordingly, when flowing at elevated temperature and pressure, the thermoplastic material prefers to flow or soak into the absorbent material and be pulled away from the cloth material or substrate. Thus, the selection of the appropriate absorbent material depends in part upon the thermoplastic adhesive used and the substrate. When the substrate is a cotton fabric, acrylic cotton blend or acrylic fabric, and the adhesive is a polyurethane or polyester thermoplastic adhesive, an appropriate substrate is simply a porous wood pulp paper commonly referred to as blotting paper.

One ply crepe toweling paper from Kimberly-Clark is preferred. Scott Microwipes brand cellulose fiber paper is also suitable. Further, the absorbent materials must be strong enough to withstand forces when pulled away from the substrate.

The relative affinity of the substrate to the thermoplastic adhesive and the absorbing sheet relative to the thermoplastic material can be easily determined without undue experimentation. To determine this, the thermoplastic is melted between the selected substrate and the absorbing material with pressure (for example 10–20 psi) forcing the substrate and material together. If most of the thermoplastic is absorbed into the absorbing material, its affinity for the molten thermoplastic material is sufficient for use in the present invention. If the substrate is a solid such as glass almost any flexible porous material will function.

The present invention also permits formation of a composite wherein the absorbing material 19 is very lightly bonded to the transfer 11. The absorbing material can be spot bonded to either the thermoplastic layer 12 or the thermoset layer 14 which is less preferred. During application the absorbing material 19 would still separate from the thermoset layer as described above. This embodiment provides for ease of manufacture, sale and use of this product.

The preceding is the description of the preferred embodiment of the present invention. Applicant does not intend to be limited by this description but only by the appended claims wherein I claim:

1. A method of applying a heat activated transfer to a substrate wherein the transfer comprises a continuous thermoplastic adhesive layer and an upper discontinuous heat resistant layer bonded to said thermoplastic adhesive layer with said transfer positioned on said substrate with said thermoplastic adhesive layer against said substrate and an absorbing sheet positioned against said upper layer, said absorbing sheet being effective to absorb said thermoplastic adhesive when said adhesive is molten; said method comprising (a) applying heat and pressure against said absorbing sheet towards said substrate thereby softening said thermoplastic layer; and (b) pressing said transfer against said substrate whereby the portion of said thermoplastic layer not underneath said heat resistant layer is absorbed by said absorbing sheet;

(c) separating said absorbing sheet from said thermoset layer whereby a second portion of said thermoplastic layer underneath said heat resistant layer remains, bonding said heat resistant layer to said substrate.

2. The method claimed in claim 1 wherein said absorbing sheet is paper.

3. The method claimed in claim 1 wherein said upper layer comprises a plurality of discrete characters bonded to said thermoplastic adhesive layer.

4. The method claimed in claim 2 wherein said absorbing sheet is crepe paper.

5. The method claimed in claim 1 wherein said heat resistant layer is a thermoset layer.

6. The method claimed in claim 5 wherein said thermoset layer is a thermoset ink.

* * * * *